United States Patent [19]
Hulett

[11] Patent Number: 6,074,692
[45] Date of Patent: Jun. 13, 2000

[54] METHOD OF MAKING MEA FOR PEM/SPE FUEL CELL

[75] Inventor: Jay S. Hulett, West Henrietta, N.Y.

[73] Assignee: General Motors Corporation, Detroit, Mich.

[21] Appl. No.: 09/058,550

[22] Filed: Apr. 10, 1998

[51] Int. Cl.[7] .............................. B05D 5/12; H01M 8/00
[52] U.S. Cl. ............................................. 427/115; 429/40
[58] Field of Search ...................... 429/40–45; 29/623.1, 29/623.5, 763; 427/115, 384, 385.5

[56] References Cited

U.S. PATENT DOCUMENTS

| | | | |
|---|---|---|---|
| 2,823,146 | 2/1958 | Roberts et al. | |
| 3,297,484 | 1/1967 | Niedrach. | |
| 4,293,396 | 10/1981 | Allen et al. | 204/106 |
| 4,349,428 | 9/1982 | Lu et al. | 204/294 |
| 4,360,417 | 11/1982 | Reger et al. | 204/290 R |
| 4,386,987 | 6/1983 | Covitch et al. | 156/155 |
| 4,414,092 | 11/1983 | Lu et al. | 204/294 |
| 4,421,579 | 12/1983 | Covitch et al. | 156/60 |
| 4,433,082 | 2/1984 | Grot | 524/755 |
| 4,581,116 | 4/1986 | Plowman et al. | 204/284 |
| 4,650,551 | 3/1987 | Carl et al. | 204/59 R |
| 4,652,356 | 3/1987 | Oda et al. | 204/283 |
| 4,654,104 | 3/1987 | McIntyre et al. | 156/276 |
| 4,666,574 | 5/1987 | Oda et al. | 204/98 |
| 4,731,263 | 3/1988 | Martin et al. | 427/385.5 |
| 4,738,741 | 4/1988 | McMichael | 156/235 |
| 4,804,592 | 2/1989 | Vanderborgh et al. | 429/33 |
| 4,826,554 | 5/1989 | McIntyre et al. | 156/280 |
| 4,876,115 | 10/1989 | Raistrick | 427/115 |
| 5,039,389 | 8/1991 | McMichael | 204/282 |
| 5,186,877 | 2/1993 | Watanabe | 264/104 |
| 5,211,984 | 5/1993 | Wilson | 427/115 |
| 5,316,871 | 5/1994 | Swathirajan et al. | 429/33 |
| 5,330,860 | 7/1994 | Grot et al. | 429/42 |

FOREIGN PATENT DOCUMENTS

WO 94/25993  11/1994  WIPO.

OTHER PUBLICATIONS

Srinivasan, et al, "Recent Advances in Solid Polymer Electrolyte Fuel Cell Technology with Low Platinum Loading Electrodes," J. Power Sources, 29 (1990) 367–387. (No Month Available).

Watanabe et al, "An Experimental Prediction of the Preparation Condition of Nafion–Coated Catalyst Layers for PEFCs," Electrochimica Acta vol. 40 No. 3 p329–334, 1995. (No Month Available).

Wilson et al, "Low Platinum Loading Electrodes for Polymer Electrolyte Fuel Cells Fabricated Using Thermoplastic Ionomers," Electrochimica Acta vol. 40 No. 3 pp355–363, 1995. (No Month Available).

Wilson et al, "Thin–film Catalyst Layers for Polymer Electrolyte Fuel Cell Electrodes," J. of Applied Electrochemistry 22 (1992) 1–7. (No Month Available).

Wilson et al, "High Performance Catalyzed Membranes of Ultra–Low Pt Loadings for Polymer Electrolyte Fuel Cells," J. Electrochem Soc. vol. 139 No. 2, Feb. 1992.

(List continued on next page.)

*Primary Examiner*—Maria Nuzzolillo
*Assistant Examiner*—Susy Tsang
*Attorney, Agent, or Firm*—Lawrence B. Plant

[57] ABSTRACT

A method of making a membrane-electrode-assembly (MEA) for a PEM/SPE fuel cell comprising applying a slurry of electrode-forming material directly onto a membrane-electrolyte film. The slurry comprises a liquid vehicle carrying catalyst particles and a binder for the catalyst particles. The membrane-electrolyte is preswollen by contact with the vehicle before the electrode-forming slurry is applied to the membrane-electrolyte. The swollen membrane-electrolyte is constrained against shrinking in the "x" and "y" directions during drying. Following assembly of the fuel cell, the MEA is rehydrated inside the fuel cell such that it swells in the "z" direction for enhanced electrical contact with contiguous electrically conductive components of the fuel cell.

8 Claims, 1 Drawing Sheet

OTHER PUBLICATIONS

Uchida et al, "New Preparation Method for Polymer–Electrolyte Fuel Cells," J. Electrochem. Soc vol. 142 No. 2, Feb. 1995.

Taylor et al, "Preparation of High–Platinum–Utgilization Gas Diffusion Electrodes for Proton–Exchange–Membrane Fuel Cells," J. Electrochem. Soc. vol. 139 No. 5, May 1992.

Ticianelli et al, "Methods to Advance Technology of Proton Exchange Membrane Fuel Cells," J. Electrochem. Soc. vol. 134 No. 9, Sep. 1988.

Ticianelli et al, "Localization of Platinum in Low Catalyst Loading Electrodes to Attain High Power Densities in SPE Fuel Cells," J. Electroanal. Chem. 251 (1988) 275–295. (No Month Available).

Shukla et al, "A Nafion–bound Platinized Carbon Electrode for Oxygen Reduction in Solid Polymer Electrolyte Cells," J. Applied Electrochem. 19(1989) 383–386. (No Month Available).

Kumar et al, "High Performance Electrodes with Very Low Platinum Loading for Polymer Electrolyte Fuel Cells," Electrochemica Acta vol. 40 No. 3, pp285–290, 1995. (No Month Available).

METHOD OF MAKING MEA FOR PEM/SPE FUEL CELL

The Government of the United States of America has rights in this invention pursuant to contract No. DE-AC02-90CH10435 awarded by the United States Department of Energy.

TECHNICAL FIELD

This invention relates to PEM/SPE fuel cells, and more particularly to a method of making the membrane-electrode-assembly (MEA) therefor.

BACKGROUND OF THE INVENTION

Fuel cells have been proposed as a power source for electric vehicles and other applications. One such fuel cell is the PEM (i.e., Proton Exchange Membrane) fuel cell which is also known as a Solid Polymer Electrolyte (SPE) fuel cell. PEM/SPE fuel cells are well known in the art, and include a so-called "membrane-electrode-assembly" (MEA) comprising a thin, solid polymer membrane-electrolyte having a pair of electrodes (i.e., an anode and a cathode) on opposite faces of the membrane-electrolyte.

In the fuel cell, the MEA is sandwiched between a pair of electrically conductive elements (i.e., electrode plates) which serve as current collectors for the electrodes, and contain a so-called "flow-field" which is an array of lands and grooves formed in the surface of the plate contacting the MEA. The lands conduct current from the electrodes, while the grooves between the lands serve to distribute the fuel cell's gaseous reactants (e.g., $H_2$ & $O_2$/air) evenly over the faces of the electrodes. A thin sheet of porous (i.e., about 80%–90% voids) paper, cloth or felt made from graphite or carbon is positioned between each of the electrode plates and the electrode faces of the MEA to support the MEA where it confronts grooves in the flow field, and to conduct current therefrom to the adjacent lands.

The membrane-electrolytes for SPE/PEM fuel cells are well known in the art. Typical such membranes are described in U.S. Pat. Nos. 4,272,353 and 3,134,697, and in the Journal of Power Sources, Volume 29 (1990), pages 367–387, inter alia. SPE/PEM membranes are proton-conductive polymers which are essentially ion exchange resins that include ionic groups in their polymeric structure, one ionic component of which is fixed or retained by the polymeric matrix and at least one other ionic component is a mobile, replaceable ion electrostatically associated with the fixed component. The ability of the mobile ion to be replaced under appropriate conditions with other ions imparts ion exchange and proton-conduction characteristics to these materials. One broad class of cation exchange, proton-conductive polymers is the so-called sulfonic acid cation exchange resin. In the sulfonic acid membranes, the cation ion exchange groups are hydrated sulfonic acid radicals which are attached to the polymer backbone by sulfonation. The preferred such resin is perfluorinated sulfonic acid polymer electrolyte in which the entire membrane structure has ion exchange characteristics. Such proton conductive membranes may be characterized by monomers of the structures:

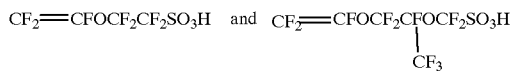

One commercial sulfonated perfluorocarbon, proton conductive membrane suitable for PEM/SPE fuel cells is sold by E. I. DuPont de Nemours & Co. under the trade designation NAFION®. Other proton conductive membranes are sold by (1) the Gore Company under the tradename Gore Select™, (2) the Asahi Glass Co. under the tradename Selemion™ and Aciplex-F™, (3) the Tokuyama Co. under the tradename Neosepta™, (4) the PALL RAI Corp. under the tradename Raipore™, (5) the Sybron Chemicals under the tradename Ionac™, (6) the Hoechst Celanese Corp., and (7) the Ballard Co. under the trade designation BAM3G™, as well as the Dais, Ionics, and Solvay S.A. After electrodes have been applied to the faces of the membrane-electrolytes they are often assembled into the fuel cell in a dry state, and allowed to swell therein when the cell is operated with hydrated reactants (i.e. $H_2$ and air).

The anode and cathode electrodes on the opposing faces of the PEM/SPE membrane typically comprise either finely divided catalyst particles (e.g., Pt or its alloys) or finely divided carbon particles having the catalyst on the surfaces thereof. The catalyst particles or catalyst-bearing carbon particles are dispersed throughout a polymeric binder or matrix which typically comprises either a proton conductive polymer and/or a fluoropolymer. When a proton-conductive material is used, it will typically comprise the same proton-conductive polymer as makes up the membrane electrolyte (e.g., NAFION®). The fluoropolymer typically comprises polytetrafluoroethylene (PTFE), though others such as FEP (Fluorinated Ethylene Propylene), PFA (Perfluoroalkoxy), and PVDF (Polyvinylidene Fluoride) are also used. These polymers create a robust structure for catalyst retention, adhere well to the membrane-electrolyte, aid in water management within the cell, and enhance ion exchange capacities of the electrodes. One such membrane-electrode-assembly and fuel cell is described in U.S. Pat. No. 5,272,017 issued Dec. 21, 1993 and assigned to the assignee of the present invention.

MEA's have heretofore been made by a number of techniques including applying a slurry comprising the carbon-supported catalyst, the polymer matrix/binder and a suitable liquid vehicle (e.g., $H_2O$, methanol, isopropanol, etc.) either (1) directly onto the membrane, or (2) onto a separate carrier or release film from which, after drying, it is subsequently transferred onto the membrane-electrolyte using heat and pressure in a decalcomania process. The latter (i.e., decalcomania) process is quite expensive in that it is slow and requires complicated fixturing to align the decal with the membrane as well as a heated press to effect the transfer. These characteristics of the decalcomania process limit the ability to make MEAs in mass production. Applying the slurry directly to the membrane, on the other hand, has potential for a low cost, mass production process and has been disclosed in such patents as Grot et al U.S. Pat. No. 5,330,860; Swathirajan U.S. Pat. No. 5,316,871; and Wilson U.S. Pat. No. 5,211,984. However, it has been found that the vehicle used to slurry the electrode materials causes swelling of the membrane to which it is applied. In this regard, all ion exchange membranes-electrolytes useful for MEA's swell in one or more directions at different rates in different vehicles used for the electrode slurry. These membrane-electrolytes can readily absorb so much of the vehicle (e.g., hydrocarbon solvents), that they can swell up to 25% or more in any given dimension. Even membranes, such as Gore Select™, which are designed such that the x–y expansion is held to about 1–2%, can still swell 25% or more in thickness. When the membrane absorbs vehicle and swells, it sags, slumps or droops which results in loss of dimensional control of the membrane and handling difficulties during processing, as well as loss of electrode coherence to the membrane-electrolyte. The present invention permits the making of lengths of MEA strip in a continuous, low cost, manufacturing process which (1) does not require any pressure to bond the electrode layers to the intermediate membrane-electrolyte layer, and (2) only enough heat to remove the vehicle and cure the polymer binder/matrix for the catalyst.

SUMMARY OF THE INVENTION

The present invention relates to a process for making a membrane-electrode-assembly (MEA) for a PEM fuel cell. The MEA has x and y directions perpendicular to each other in the principal plane of the MEA, and a z direction through the thickness of the assembly normal to the principal plane. The process includes the principal steps of (a) preparing an electrode-forming slurry comprising finely divided catalyst, a polymer binder for the catalyst, and a liquid vehicle for the catalyst and binder, (b) coating a proton-conductive, polymeric membrane-electrolyte with the slurry to form a slurry-coated membrane, and (c) heating the slurry-coated membrane to remove the vehicle (i.e., dry the MEA) and cure the polymer binder. More specifically in the context of such a process, the present invention contemplates the improvement wherein before coating the membrane-electrolyte with the electrode-forming slurry, it is first contacted (e.g. dipped, sprayed, etc.) with a swelling agent that is the same composition as the vehicle used to make the electrode-forming slurry. This contact is for a duration sufficient to swell the membrane-electrolyte in the x, and y directions in the principal plane of the membrane-electrolyte, as well as in and the z direction normal to the principal plane (i.e., through the thickness of the membrane-electrolyte) so as to thereby form a preswollen membrane-electrolyte. The selection of the vehicle for the electrode-forming slurry is predicated on the choice of membrane-electrolyte material, and is such as to minimize the amount of swelling in the membrane-electrolyte. Hence, for example, when membrane-electrolytes comprising sulfonic acid cation exchange fluorocarbons are used, the vehicle will preferably be selected from the group consisting of water and glycols to minimize swelling of the membrane-electrolyte.

After the membrane-electrolyte has swollen, it is constrained against shrinking in the x and y directions, but free to shrink in the z direction during drying. Thereafter, the preswollen and constrained membrane is coated with the electrode-forming slurry to form a slurry-coated membrane. Coating may be accomplished by any convenient way known to those skilled in the coating art, but will preferably be effected by spraying or extruding a thin film of the slurry directly onto the membrane-electrolyte without touching it with an applicator (e.g., a brush). Finally, the slurry-coated membrane is heated to dry the slurry-coated membrane (i.e., remove the vehicle), and cure the polymer binder. Heating is conducted while continuing to constrain the membrane-electrolyte to keep it from shrinking in the x and y directions. According to one embodiment of the invention, the preswollen membrane is mounted in a frame to constrain it from shrinking in the x and y directions.

According to a preferred embodiment of the invention, the MEA is made in a continuous strip or ribbon in a continuous manufacturing operation. The strip has an x direction in the longitudinal direction of the strip, a y direction perpendicular to the longitudinal direction in the principal plane of the MEA, and a z direction through the thickness of the assembly (i.e., normal to the principal plane of the strip). In this embodiment the process comprises the steps of:

1. preparing an electrode-forming slurry comprising finely divided catalyst, a polymer binder for the catalyst and a liquid vehicle for the catalyst and binder;
2. tensioning a strip of polymeric, membrane-electrolyte material in the longitudinal x direction while drawing it through a source (e.g., bath, spray chamber, etc.) of, and contacting it with, the vehicle to swell the membrane-electrolyte in the x, y and z directions, and form a preswollen strip;
3. grasping the lateral edges of the preswollen strip along the length of the strip (i.e., that extend in the longitudinal x direction) while continuing to tension the strip to prevent said strip from shrinking in the x and y directions during drying;
4. coating the strip with the slurry to form a slurry-coated strip;
5. heating the slurry-coated strip to dry it and cure the polymer binder, which heating is conducted while continuing the tensioning and grasping to prevent the coated strip from said shrinking in the x and y directions, while allowing it to shrink in the z direction;
6. discontinuing the tensioning and grasping;
7. cutting the strip into pieces commensurate with the size and shape of the fuel cell; and
8. assembling the pieces into a fuel cell.

The MEA pieces may be hydrated with hot water or steam before they are assembled into the fuel cell, but will preferably be assembled into the fuel cell while dry and subsequently hydrated (i.e., with hot liquid or water vapor) in the fuel cell after assembling, but before the fuel cell is operated to produce current. In the preferred assembly technique, the MEA pieces swell in the z direction in situ within the cell, after assembly, which promotes reduced contact resistance between the MEA and the contiguous cell components (i.e., carbon/graphite paper, cloth, felt, etc., or flow field lands on the interelectrode current collector plates) that serve to collect current from the electrodes on the faces of the MEA.

BRIEF DESCRIPTION OF THE DRAWINGS

The invention will be better understood when considered in the light of the following description of certain embodiments thereof which is given hereafter in conjunction with the drawings in which.

DETAILED DESCRIPTION OF A PREFERRED EMBODIMENT OF THE INVENTION

Figure 1:
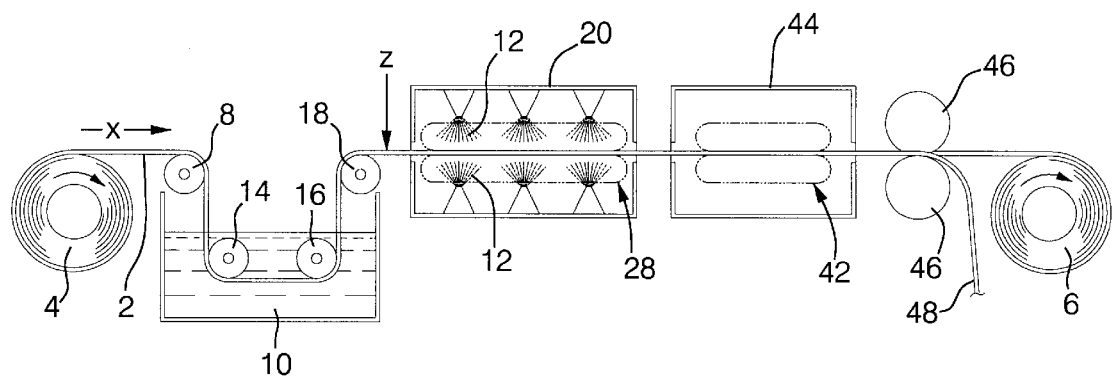
FIG. 1 is a schematic of a process for the continuous production of MEAs in accordance with the present invention.

FIG. 1 depicts a process for the continuous manufacture of a continuous strip/ribbon of MEA material in accordance with the preferred embodiment of the present invention. More specifically FIG. 1 depicts a continuous length/strip 2 of membrane-electrode material being drawn off of a supply reel 4, through a series of processing stations and onto a take-up reel 6. The strip will have a thickness of about 10 to about 125 microns depending on which material is used. The take-up reel 6 pulls the strip 2 through the stations, and maintains sufficient tension thereon in the longitudinal "x" direction to prevent the strip 2 from shrinking in the "x" direction during the drying operation discussed hereafter. Upon leaving the reel 4, the strip 2 passes over roller 8 and into a bath 10 of a liquid swelling agent. Alternatively, the swelling agent could be sprayed or otherwise applied onto the strip 2. The strip 2 has sufficient residence time in the bath 10 to swell the strip 2 therein in the "x", "y" (i.e., into the plane of the Figure), and "z" (i.e., thickness) directions. The liquid that forms the bath 10 has the same composition as the vehicle used to formulate the electrode-forming slurry 12 discussed hereinafter. The strip 2 passes under rollers 14 and 16 in the bath 10 and exits the bath 10 over roller 18.

After the strip 2 exits the bath 10, it enters a coating station 20 where a slurry 12 of electrode-forming material is deposited (e.g., sprayed) onto both faces of the strip 2. The slurry comprises small particles of catalyst (e.g., Pt or Pt alloys), alone or on the surface of larger carbon particles, a polymeric binder for the particles and a liquid vehicle for the particles and binder. A preferred binder comprises the same material that the strip 2 is made from which is a proton-conductive, ion exchange material such as described above in the "Background of the Invention," and are well known in the art. Alternatively, either alone or in combination with the proton-conductive material, the binder may comprise any of a number of other polymers such as the fluoropolymers described above in the "Background of the Invention." Such slurries will typically comprise about 5% to about 10% by weight catalyst/carbon particles, about 2% to about 5% by weight polymeric binder, and the balance liquid vehicle therefor. The coatings are applied to a wet thickness of about 80 to about 250 microns and subsequently dries to a finished thickness of about 1 to about 20 microns. The vehicle may be a single material or a mixture of two or more materials. Hence, for example when Nafion®, supra, is used, the vehicle will preferably comprise either water or a mixture of water and a glycol such as ethylene or propylene glycol which are satisfactory suspension vehicles for forming the electrode-forming slurry yet are relatively poor swelling agents for Nafion®. It is desirable to avoid vehicles which are strong swelling agents (i.e., cause too much swelling). Hence for example aliphatic alcohols, such as methanol and 2-propanol, rapidly swell most cation exchange membranes greater than 24% in linear dimensions. Longer chain hydrocarbons are preferred vehicles because they take longer to diffuse into the membrane and swelling thereby can be controlled by limiting exposure time to the vehicle. A membrane is considered to be overswollen if after it is cured in a shrinkage-constrained condition the membrane either tears or has unacceptable gas permeabilities. One screening procedure for evaluating prospective vehicles is to measure the final gas permeabilities of cured MEAs. For example, if the final gas permeability exceeds 0.5 to 1.0 sccm between 10 and 20 psi differential pressure, then the membrane has been excessively swollen. A different solvent system needs to be identified that reduces the swelling of the particular membrane material being used. Experience has shown that the best solvents for processing sulfonic-acid-type cation exchange membranes are (a) water and/or (b) any one of the family of 1,2-diols. These are dihydroxy alcohols containing two-OH groups on adjacent carbons (also known as glycols). The most preferred vehicles of this group are ethylene glycol and/or propylene glycol due to their swelling rate, viscosity, vapor pressure, and compatibility with known membrane materials. These materials make excellent electrode-forming slurry vehicles. Membrane pre-swelling times with these materials will generally be limited to under 6 minutes to prevent excessive swelling prior to lateral constraint and longitudinal tensioning. Sometimes the binder is supplied by the supplier as a suspension in a vehicle provided by the supplier (e.g., Nafion® in a water-aliphatic alcohol mixture). When this occurs, it need only be mixed with the desired vehicle (e.g., ethylene glycol) followed by heating to drive off the aliphatic alcohol and leave the polymer binder in the water-glycol vehicle which does not swell the membrane-electrolyte as much as the aliphatic alcohols.

Figure 2:
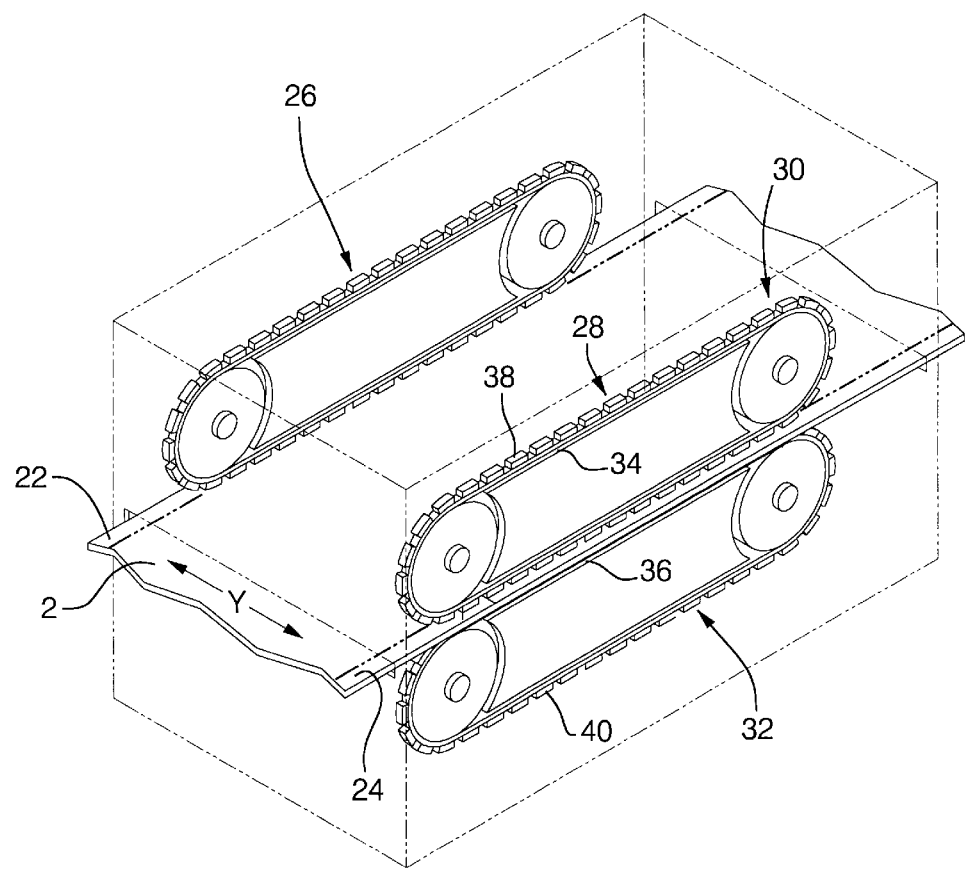
FIG. 2 is an isometric view illustrating tractor clamps used for handling MEA strip in the coating and heating stages of the preferred process of the present invention.

Upon exiting the bath 10, the lateral edges 22 and 24 (see FIG. 2) of the strip 2 are grasped by a set of tractor clamps 26 and 28, such as are well known in the textile and plastic industries and can be found in so-called "tenting furnaces" or the like. Each tractor clamp, e.g. 28, comprises an upper member 30 and a lower member 32 which are essentially belts 34, 36 that move round-and-round in an oval path and carry clamping pads 38 and 40 thereon that tightly sandwich the edges 22 and 24 of the strip 2 therebetween and keep it taut as the strip 2 advances through the coating station 20. In small batch development work, constraint is provided for individual samples with tensioning frames which are placed in a standard cabinet furnace for heat treatment.

Upon exiting the coating station 20, the strip is released from the first set of tractor clamps 26, 28 and immediately thereafter grasped by a second set of tractor clamps 42 like those in the coating station 20, but now for conveying the strip 2 through a drying station/oven 44 where the vehicle is driven off and the binder cured. Alternatively, a single set of tractor clamps that pass through both the coating and the heating stations could be used in lieu of the two sets shown in the Figures. The tractor clamps prevent the strip 2 from shrinking in the "y" direction across the width of the strip 2 while the tension applied in the "x" by the take-up reel 6 prevents shrinking of the strip 2 in the longitudinal "x" direction. The drying oven 44 may be any conventional oven such as a radiant or forced air type oven. The temperature of the oven will depend on the composition of the vehicle that is to be volatized and removed as well as the composition and curing temperature of the particular binder chosen. Preferably, the oven will be a multi stage oven having different temperatures in different zones thereof. In this regard, the oven will have a cooler zone at the beginning for volatizing the vehicle at a sufficiently slow rate that bubbling and/or cracking of the electrode layer does not occur, followed by a hotter zone where curing takes place. After curing, the electrodes will typically comprise about 50% to about 80% by wt. supported catalyst and the balance binder. Most membranes require a low temperature cycle between about 60° C. and about 90° C. for 10 to 60 minutes or more, to drive off the majority of the vehicle. This is followed with a short duration curing temperature cycle which is dependent upon the particular polymer used in the electrode and the thermal degradation limits of the cation exchange membrane used. In the protonically conductive sulfonic acid form, most membrane-electrolyte materials have a maximum processing temperature that is less than 150° C. Temperatures between 100° C. and 150° C. are adequate for curing many of the polymer resins commonly used in the electrode structures, with cycle times ranging from 1 to 30 minutes, again dependent upon the vehicle chemistry used.

The tractor clamps 42 release the strip 2 as it exits the oven 44. Thereafter, the strip 2 passes into the nip if a set of rotary knife blades 46 where the edges 22 and 24 are trimmed off as offal 48. The offal 48 is recovered and recycled back into the process that makes the membrane-electrolyte strip 2. Thereafter, the strip 2 is wound onto the take-up reel 6 for storage or transport to a cutting station (not shown) where the strip 2 is cut into pieces commensurate with the size and shape of the fuel cell into which they are to be assembled.

The thusly formed MEA pieces can not be used in the dry state, but rather must be hydrated to be useful in the fuel cell. Hydration of the MEA pieces may be accomplished outside of the fuel cell by exposing them to hot water, as for example, by immersing them in a bath of hot water or in a steam-filled chamber. When so hydrated, the MEA will swell significantly in the "z" direction without any significant dimensional changes in the "x" and "y" directions, but are difficult to handle. Preferably, the MEA pieces will be assembled into the fuel cell in their dry state, and hydrated therein by passing either hot water, steam, or $H_2O$-saturared gas (e.g. reactants) through the cell. In this regard, it is much easier to handle the MEAs during assembly when they are dry. Hydrating the MEA pieces inside the already assembled fuel cell is seen to result in the MEA swelling or expanding in the "z" direction inside the cell thereby forcing the MEA into tighter engagement with the contiguous current collectors such as the carbon/graphite paper/cloth/felt or flow field lands for reduced contact resistance therebetween.

When the membrane is "pre-swollen" in the identical solvent composition as is used in the electrode-forming slurry, in accordance with the present invention, and the slurries applied to the pre-swollen membrane, there is no significant additional dimensional change in the membrane, thereby maintaining the dimensional integrity of the uncured catalyst layers. Coating of the slurry is best accomplished by air atomized spraying, liquid nozzles, or slot coating which do not require applicators contacting the membrane-electrolyte. It is also possible to use known printing techniques including screen printing, dip coating, flexography, or other roll coating techniques but care must be taken not to damage the membrane-electrolyte. Most preferably, coating is accomplished using banks of air-atomized spray nozzles available from Binks, Co., Nordson Co., Paasche Inc., or other spray equipment companies.

Thermal drying and curing the slurry coated membrane drives off the solvents and causes the membrane to shrink. The dimensional integrity of the electrode coated membrane is maintained by tensioning the membrane longitudinally and constraining it laterally such that it cannot shrink in the "x" and "y" area dimensions. In all cation exchange resin membranes, this causes the material to shrink instead in thickness (i.e., it only gets thinner). Thickness reduction is proportional to the linear x and y increases in the solvent swollen membrane prior to constraint, by a ratio that varies dramatically with different solvents and membranes.

EXAMPLES

Example 1

Anode and cathode electrode-forming slurries were identically formulated and comprised (1) 40% by weight platinum supported on 60% by weight Vulcan® xC-72 carbon black (obtained from E-Tek Corp.), (2) 5% Nafion® in a water and aliphatic alcohol mixture (obtained from Solution Technologies, Inc.), and (3) ethylene glycol. The component quantities were selected such that the ratio of carbon-supported catalyst to Nafion® resin in the finished electrodes would be 3:1, and ethylene glycol would comprise 52% by wt. of the slurry for spray application. Nafion® N112 membrane-electrolyte (obtained from DuPont) having a thickness of about 60 microns was dipped for 4 minutes in ethylene glycol, then constrained and tensioned by clamping in a perimetrical frame to provide a flat surface for electrode slurry application. Excess ethylene glycol was removed from the membrane surfaces with a squeegee. The catalyst slurry was sprayed on both sides of the membrane to obtain a wet thickness of 125 microns. The electrode-coated-membrane was heated for 30 minutes at 80° C. to remove the ethylene glycol, followed by heating at 130° C. for 10 minutes to cure the Nafion®. The thusly formed MEA had identical electrodes 10 microns thick, with a platinum surface loading of 0.4 mg $Pt/cm^2$. The constrained and dried/cured MEA demonstrated a thickness reduction of about 33%, i.e. from 60 microns to 40 microns, but maintained gas permeabilities below 0.1 sccm with a differential cell pressure of 15 psi. The electrodes were coherent, showed no evidence of delamination from the membrane, and were ready to be sized and assembled with gas diffusion media into a fuel cell. The MEAs were assembled into a fuel cell and hydrated therein by flushing the fuel cell with 100% relative humidity $H_2$ and air. The fuel cell was operated successfully for about 100 hours, and, upon disassembly, showed that the MEAs had regained most of the thickness they had lost during the drying/curing operation.

Example 2

An anode electrode slurry was prepared using (1) 20% platinum ruthenium catalyst supported on Vulcan® xC-72 carbon black (obtained from E-Tek Corp.), (2) 10% Nafion® solution (obtained from Solution Technologies, Inc.), and (3) 2-propanol as the vehicle. The anode slurry quantities were selected such that the ratio of supported catalyst to Nafion® resin in the finished anode electrode would be 1:1. A cathode electrode slurry was prepared using (1) 40% platinum catalyst supported on Vulcan® xC-72 (obtained from E-Tek Corp.), (2) 5% Nafion® solution (obtained from Solution Technologies, Inc.), (3) Zonyl® MP1200 fluorocarbon (obtained from DuPont), and (4) 2-propanol as the vehicle. The cathode slurry formulation used a ratio of supported catalyst to polymer binder resins of 2:1. Gore-Select™ membrane (obtained from Gore & Associates) was dipped in 2-propanol for 1 minute, and then clamped in a frame and tensioned to provide a flat surface for coating. Excess 2-propanol was removed with a lint-free wipe. The catalyst slurries were sprayed on both sides of the membrane, the anode reaching a wet thickness of 120 microns, and the cathode a thickness of 230 microns. The coated membrane was heated for 20 minutes at 60° C. to remove the 2-propanol, followed by heating at 120° C. for 10 minutes to cure the binder. The completed structure included an anode electrode 10 microns thick with a catalyst loading of 0.15 mg $Pt/cm^2$, and a cathode electrode 16 microns thick and a catalyst loading of 0.8 mg $Pt/cm^2$. The electrodes were coherent and showed no evidence of delamination from the membrane.

Example 3

An anode electrode slurry was prepared using (1) 20% platinum-tin catalyst supported on Ketjen® carbon black (obtained from E-Tek Corp.), (2) 10% Nafion® solution (obtained from Solution Technologies, Inc.), and (3) propylene glycol. The anode slurry formulation had a ratio of supported catalyst to binder of 1:1. A cathode slurry was prepared using (1) 20% platinum-cobalt-chromium catalyst supported on Vulcan® xC-72 carbon black (obtained from E-Tek Corp.), (2) 5% Nafion® solution (obtained from Solution Technologies, Inc.), Kynar® 301F (obtained from Elf Atochem), (3) Triton® x-100CG (obtained from Union Carbide), and (4) propylene glycol. The cathode slurry formulation used a ratio of supported catalyst to resin of 2:1. Raipore™ R4010 membrane (obtained from PALL RAI Corp.) was dipped in propylene glycol for 6 minutes, then clamped in a frame and tensioned to provide a flat surface for coating. The coated membrane was heated for 50 minutes at 80° C. to remove the glycol, followed by heating at 120° C. for 15 minutes to cure the polymer binders. The completed MEA had a 10 micron thick anode electrode and 14 micron thick cathode each with a catalyst loading of 0.15 mg catalyst/cm$^2$. The electrodes were coherent and showed no evidence of delamination from the membrane. The Raipore™ R4010 membrane thinned from approximately 70 microns to 56 microns during processing, with final gas permeabilities remaining less than 0.3 sccm at differential cell pressure of 15 psi. Upon hydration the membrane recovered much of the thickness it had lost.

Example 4

The electrodes described in Example 1 were applied to a Dow Chemical Co. xUS membrane dipped for 3 minutes in ethylene glycol. This coated membrane was heated at 80° C. for 30 minutes for drying, followed by 120° C. for 15 minutes for curing. Final electrode properties were as described in Example 1. Gas permeabilities remained less that 0.1 sccm at 15 psi. The electrodes were coherent and showed no evidence of delamination from the membrane.

Example 5

The process described in Example 1 was repeated, with ethylene glycol replaced with water. The entire formulation was aqueous, with no other vehicles present in the electrode-forming slurries or membrane. The thickness reduction of the N112 Nafion® membrane was only 40% of the value when ethylene glycol was used. Gas permeabilities remained less than 0.1 sccm at 15 psi. The electrodes were coherent and showed no evidence of delamination from the membrane.

While the invention has been described in terms of certain specific embodiments thereof it is not intended to be limited thereto, but rather only to the extend set forth hereafter in the claims which follow.

What is claimed is:

1. In the process of making a membrane-electrode assembly for a PEM fuel cell said membrane-electrode-assembly having x and y directions perpendicular to each other in a plane of the membrane-electrode-assembly and a z direction through a thickness of the assembly normal to said plane, said process comprising the principal steps of (a) preparing an electrode-forming slurry comprising finely divided catalyst, a polymer binder for said catalyst and a liquid vehicle for the catalyst and binder, (b) coating a proton-conductive, polymeric membrane-electrolyte with said slurry to form a slurry-coated membrane, and (c) heating said slurry-coated membrane to remove said vehicle and cure said polymer binder, the improvement comprising:

i. before said coating, contacting said membrane-electrolyte with said vehicle for a time sufficient to swell said membrane-electrolyte in the x, y and z directions, and thereby form a preswollen membrane-electrolyte;

ii. constraining said preswollen membrane-electrolyte against shrinking in said x and y directions during drying;

iii. coating the preswollen and constrained membrane with said slurry to form a slurry-coated membrane; and iv. heating the slurry-coated membrane to dry said slurry-coated membrane and cure said polymer binder, said heating being conducted while continuing said constraining to prevent the coated membrane from said shrinking.

2. A process according to claim 1 including the step of mounting said preswollen membrane in a frame to effect said constraining.

3. A process according to claim 1 wherein said polymeric membrane-electrolyte comprises a sulfonic acid cation exchange fluorocarbon, and the vehicle is selected from the group consisting of water and glycol to minimize swelling of the membrane-electrolyte.

4. A process of making a continuous strip of membrane-electrode-assembly material for a PEM fuel cell, said strip having an x direction in the longitudinal direction of said strip, and a y direction perpendicular to said longitudinal direction in a plane of the membrane-electrode-assembly, and a z direction through a thickness of the assembly normal to said plane, said process comprising the steps of:

i. preparing an electrode-forming slurry comprising finely divided catalyst, a polymer binder for said catalyst and a liquid vehicle for the catalyst and binder;

ii. tensioning a strip of polymeric, membrane-electrolyte material in the longitudinal x direction while drawing said strip through a source of, and contacting it with, said vehicle to swell said membrane-electrolyte in the x, y and z directions, and form a preswollen strip;

iii. grasping the lateral edges of said preswollen strip that extend in said longitudinal x direction while continuing to tension said strip in the x direction to prevent said strip from shrinking in the x and y directions during drying;

iv. coating said strip with said slurry to form a slurry-coated strip;

v. heating the slurry-coated strip to dry said slurry-coated strip and cure said polymer binder, said heating being conducted while continuing said tensioning and grasping to prevent the coated strip from said shrinking in the x and y directions, while allowing said strip to shrink in the z direction;

vi. discontinuing said tensioning and grasping;

vii. cutting the dried slurry-coated strip into pieces; and viii. assembling said pieces into a fuel cell.

5. A process according to claim 4 including the step of hydrating said pieces before said assembling.

6. A process according to claim 4 including the step of hydrating said pieces in said fuel cell after said assembling, whereby said pieces swell in the z direction and promote enhanced electrical contact with contiguous cell components adapted to collect current from said membrane-electrode-assembly.

7. A process according to claim 6 including the step of flowing hot water through said fuel cell to hydrate said pieces in said cell.

8. A process according to claim 7 wherein said hot water is steam.

* * * * *